Feb. 9, 1937. W. KREUTZ 2,070,362
METHOD OF MAKING CHAINS
Filed Aug. 18, 1932
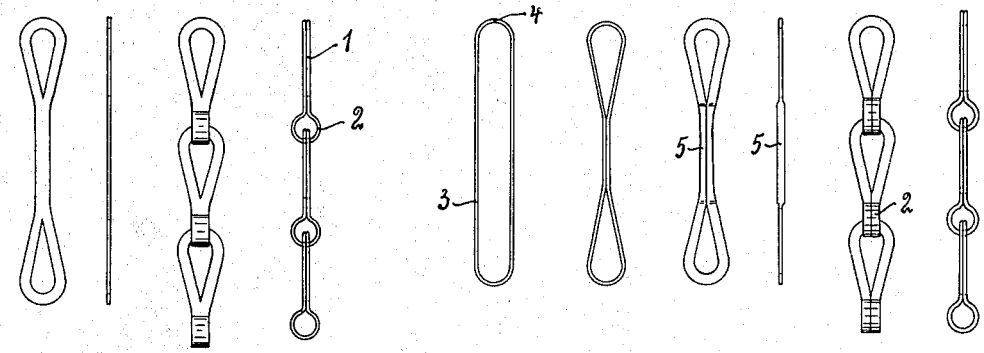
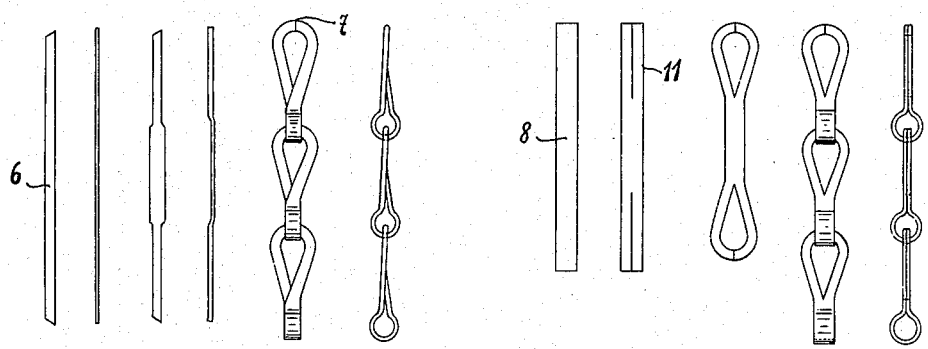
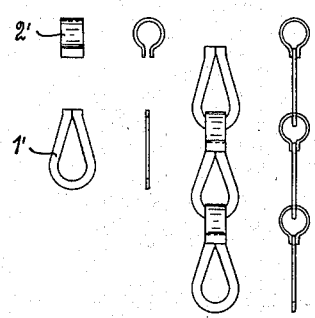
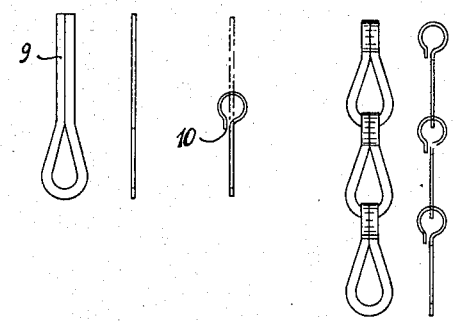
INVENTOR
WILLY KREUTZ
BY his ATTORNEY
C. P. Goerel Patented Feb. 9, 1937

2,070,362

UNITED STATES PATENT OFFICE 2,070,362

METHOD OF MAKING CHAINS

Willy Kreutz, Duren, Rhineland, Germany, assignor to Felix Schüll, Duren, Germany Application August 18, 1932, Serial No. 629,268
In Germany September 30, 1931

3 Claims. (Cl. 59—35)

My invention relates to the making of so-called patent chains of which the links are each composed of a large eyelet and a small eyelet which are directed perpendicularly to each other, both made of flat metal and united with each other by inserting the narrow side of a link through the large eyelet of the adjacent link. Chains of this kind are possessed of a great tensile strength as compared with the size and the weight of the chain and for this reason are preferred for many purposes and have found wide application. Chains of this kind, however, are connected with the disadvantage that the process of making the chains is inconvenient and uneconomical. A further drawback connected with these known chains consists therein that the small eyelet is made up only from a single sheet or layer of metal and in consequence of this every link of the chain has a weak point at the place of the small eyelet and therefore does not possess the greatest possible tensile strength for a given expenditure of material. In addition to the aforementioned disadvantages the manufacture of the so-called patent chains requires an excessive amount of initial material, because the links of the chain must be punched out of sheet metal, band iron, flat iron or the like which necessitates a great amount of waste material. In addition to this it had heretofore been necessary to use for each form of chain special punches which are mostly rather expensive and, in addition, subject to heavy wear. The various attempts which have so far been made to provide a substitute for the aforementioned patent chains in the form of a different kind of chain which may be made at a smaller expense from round or flat wire have not led to any practical success, because none of these substitutes could attain, not even approximately, the properties of the so-called patent chains, especially as to tensile strength.

My invention has for its object to make chains of a quality superior to that of known so-called patent chains and to devise proper processes by which the aforementioned disadvantages and drawbacks inherent to known chains are successfully avoided. By my invention, in particular, it will be possible to make chains at the smallest expenditure of material and to avoid at the same time any kind of waste in making the links. In addition to this, chains made according to my invention are possessed of a tensile strength which even surpasses that of the known so-called patent chains.

According to my invention the links of the chain are made from pieces of round or flat wire of even cross-section throughout and fashioned by rolling, flattening or the like in a manner that the small eyelets are able to sustain the same tensile strain as the large eyelets. According to my invention, furthermore, the several links of the chain are closed up by welding or soldering which may be done either during or subsequent to making the links. The links may consist of any metal desired, and more especially, of iron or steel.

The process of making chains according to my invention may be carried out in various ways. In carrying out my invention, for instance, at first a closed eyelet of circular or any desired other form is made from round or flat wire and said eyelet is thereupon fashioned into the form of the links of a so-called patent chain by bending, pressing or folding. However, it is also possible to first fashion the links into proper form and thereupon carry on the welding or soldering. It is further possible to use as initial material for the links a metal strip which is deeply cut-in at both of its ends and to form thereupon the eyelets from the said ends by bending and subsequent welding or soldering together the abutting ends. Also, the large eyelet may first be made from flat material and the free ends of the latter may now be bent to form the small eyelet and united with each other by welding or soldering, or the small as well as the large eyelets may first be made from flat material and united with each other in the desired position, that is one rectangularly to the other, by welding or soldering.

In the accompanying drawing which forms part of the specification I have illustrated some examples of the aforementioned different modes of making the links and composing the chain therefrom. I have further shown a construction of a known patent chain in order to more clearly illustrate the differences which exist between the construction of known chains and that of chains made according to my invention.

Figs. 1 and 2 are a front and side-view, respectively, of a link of a known patent chain, said link being punched out of sheet metal in straight condition before folding it into its final form, while Figs. 3 and 4 show likewise in front and side-view, respectively, a completed known patent chain composed of links according to Figs. 1 and 2 by properly bending the links and passing the large eyelet of each link through the small eyelet of the adjacent link. As the links of known patent chains are made by punching the same out of a full sheet or band of metal, it will be evident that there will be produced a considerable amount of waste material. Besides, the large eyelet 1 of each link of the chain consists of two layers of sheet metal, while the small eyelet 2 of each link consists only of a single layer of sheet metal and in consequence of this the small eyelet 2 of each link forms a weak point at which the chain is liable to tear when exposed to a heavy strain.

In Figs. 5, 6, 7, 8, 9 and 10 I have shown one novel form of construction of chain, it being assumed in the present case that a wire of round cross-section forms the initital material for making the link. In this example of construction first a closed loop 3 is made from said wire and the abutting ends are united at 4 by welding or soldering. This welding or soldering, however, may eventually also be carried out at a later stage of the process of making the links. The closed loop of wire shown in Fig. 5 is now brought into the shape shown in Fig. 6 and thereupon flattened so that there will be obtained the shape shown in Figs. 7 and 8 in front and side-view, respectively. As may be seen from Fig. 7 and more particularly from Fig. 8, the initial wire of round cross-section is flattened to a greater extent at the ends than at the central portion 5 with the result that the small eyelet 2 in completed form of the links, as shown in Figs. 9 and 10 in front and side-view, respectively, is made up from relatively thick material.

In Figs. 11, 12, 13, 14, 15 and 16 I have shown a second novel construction of chain in which the links are formed from a flat wire 6 as initial material as shown in Figs. 11 and 12 in a front and side-view, respectively. This flat wire 6 is bent into the form of the links of the chain as shown in Figs. 15 and 16, whereupon the large eyelet is closed up at the abutting ends, for instance, as shown at 7 in Fig. 15. In the present construction of the links the initial material may also be flattened in such a manner that the central portion is wider and thinner than the end portions as shown in Figs. 13 and 14.

A further construction of chain forming part of my invention is shown in Figs. 17, 18, 19, 20 and 21. In this construction of chain the large eyelet is formed from the two ends of a metal strip 8 which is deeply cut in at both ends as shown at 11 in Fig. 18. Closing of the large eyelet may in this case be effected in the same manner as mentioned in connection with Figs. 5 and 15 at the abutting ends by welding or soldering so that preliminarily there will be obtained the link of stretched form as shown in side-view in Fig. 19. This stretched link may further be worked in known manner. Welding or soldering together the abutting ends of the large eyelet in this case may eventually also be carried out after folding the flat link shown in Fig. 19 into its final form shown in Figs. 20 and 21 in front and side-view, respectively. In every case the large eyelets which are formed by folding together, for instance, the flat ends of the preliminarily formed link shown in Fig. 19 or in Figs. 7 and 8 or Figs. 11 and 12 or Figs. 13 and 14 may be welded or soldered together at their abutting ends.

In the further novel construction of chain shown in Figs. 22, 23, 24 and 25 the chain links consists each of two open eyelets 1' and 2' made from a piece of flat wire or metal strip, the two eyelets having a form as shown as an example in Fig. 22 in front-view and in Fig. 23 in side-view. The two eyelets 1' and 2' are united with each other by soldering or welding to form as a whole a chain link of the completed chain shown in Fig. 24 in front-view and in Fig. 25 in side-view.

A still further novel construction of chain which forms part of my invention is shown in Figs. 26, 27, 28, 29 and 30. In this construction the ends 9 of a metal strip or flat wire are folded together as shown in Fig. 26 in front-view and in Fig. 27 in side-view so as to form the large eyelet at the central portion of said strip or wire, while the small eyelet is formed by bending said ends 9 into the shape of a ring as shown in side-view in Fig. 28. Closing the so obtained small eyelet may again be effected by welding or soldering at 10. The completed chain composed of links according to Figs. 26, 27 and 28 is again shown in Fig. 29 in front-view and in Fig. 30 in side-view.

The several novel constructions of chain links and modes of making same as shown in the several constructions represented by each group of Figs. 5 to 10, Figs. 11 to 16, Figs. 17 to 21, Figs. 22 to 25 and Figs. 26 to 30 are only some exemplifications of novel constructions and modes of making the links and composing the chain therefrom. An essential feature of my invention consists therein that the chain is formed in the manner of a so-called patent chain having links which in contra-distinction to known processes of making the links from material punched out of a full sheet of metal are made by closing a wire or strip of metal and bending or folding or otherwise fashioning the same into a chain link and by welding or soldering the abutting ends to each other.

While I have shown in the accompanying drawing and described in detail in the above specification some preferred forms of constructions of chains and modes of making and uniting the links thereof, I desire it to be understood that the specific disclosure is for the purpose of exemplification only and that the scope of my invention is defined in the following claims in which I have endeavored to distinguish it from the prior art without, however, relinquishing or abandoning any portion or feature thereof.

I claim:

1. The method of making links of chains, which consists in cutting a length of round wire, returning the length of wire upon itself and welding the opposite ends thereof together to provide a continuous length of wire, flattening the wire, and bending the continuous length of wire into opposite end link eyes disposed axially at right angles to each other.

2. The method of making links of chains, which consists in cutting a length of wire, overturning the wire to provide a loop, welding the ends of the length of wire, bending the looped wire into substantially figure 8 form, flattening the ends of the loop, overturning the intermediate portion of the bent loop to provide an eye for one end of the link and leaving opposite ends of the loop one to provide an opposite end eye of double thickness for the opposite end of the link.

3. The method of making chain links, which consists in cutting a length of wire and bending the same into a loop, welding the ends of the wire, compressing the sides of the loop together to provide a figure 8 construction, flattening the ends of the loop, flattening the intermediate portion of the loop to a less extent than the end portions and overturning the bent flattened loop to provide a small eye of double thickness at the intermediate portion of the loop and a pair of larger eyes at the ends of the loop adapted to engage in face to face relation to provide an eye opposite to the eye of double thickness and axially at right angles to the first eye.

WILLY KREUTZ.